G. W. HOLLAND.
PINCH BAR.
APPLICATION FILED SEPT. 12, 1913.
1,094,992.
Patented Apr. 28, 1914.
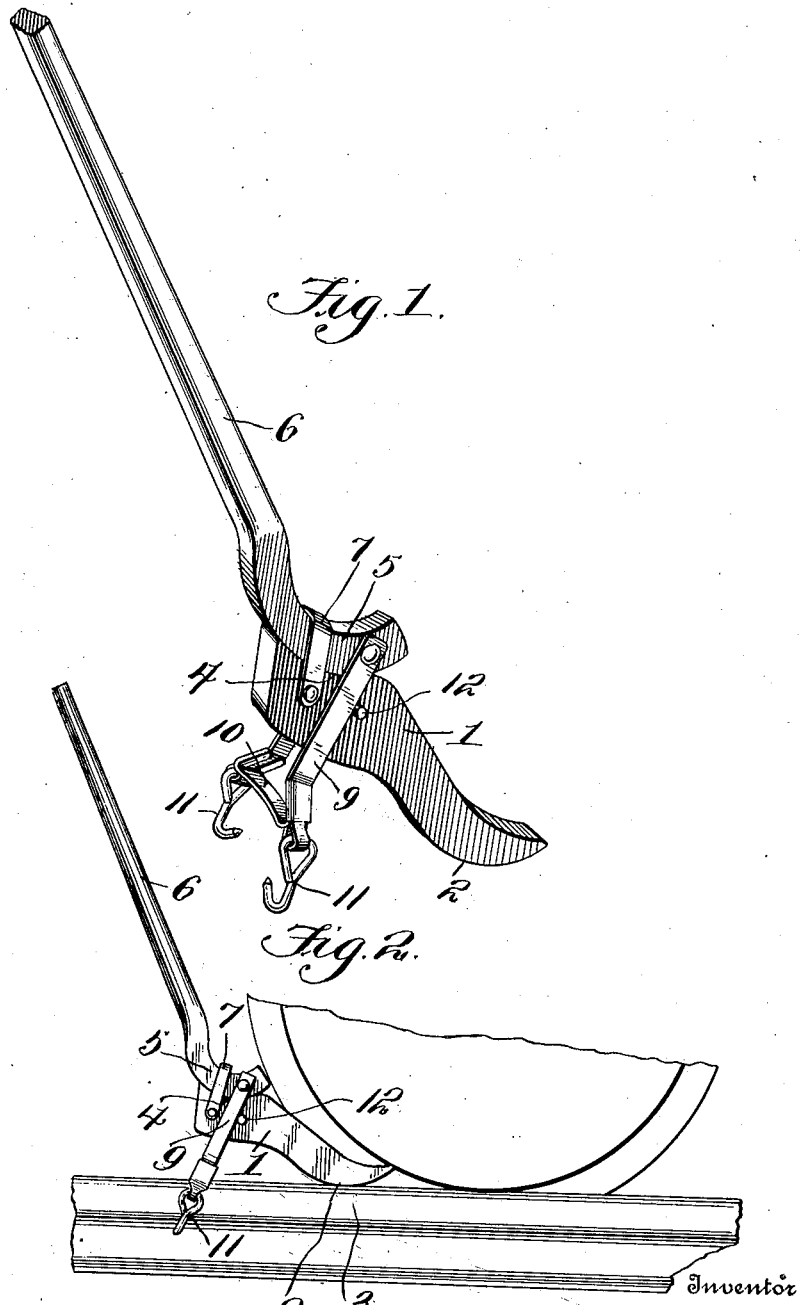

UNITED STATES PATENT OFFICE.

GEORGE W. HOLLAND, OF TOMBSTONE, ARIZONA.

PINCH-BAR.

1,094,992.

Specification of Letters Patent.   Patented Apr. 28, 1914.

Application filed September 12, 1913.   Serial No. 789,537.

*To all whom it may concern:*

Be it known that I, GEORGE W. HOLLAND, a citizen of the United States, residing at Tombstone, in the county of Cochise and State of Arizona, have invented new and useful Improvements in Pinch-Bars, of which the following is a specification.

The invention relates to an improvement in pinch bars, and particularly to a bar of this type which may be readily and quickly handled for the purpose in view and which will grip the rail head to prevent possibility of rearward slipping during operation.

The main object of the present invention is the provision of a pinch bar including an operating lever and a pressure foot slidably connected to said lever, the lever being provided with a gripping element mounted for a limited sliding play upon the pressure foot and provided beyond the same with hooks to grip the head of the rail.

The invention in its preferred form of details will be described in the following specification, reference being had particularly to the accompanying drawings, in which:—

Figure 1 is a perspective of the improved pinch bar. Fig. 2 is a side elevation illustrating the use of the same.

Referring particularly to the accompanying drawings, the improved pinch bar comprises a pressure foot 1 having the forward end curved on the upper side in conformity with the curvature of the wheel and on the lower side to form a fulcrum 2 to bear upon the rail 3. The rear end of the pressure bar on its upper surface is formed with a concavity 4 to receive the rounded or hooked end 5 of the operating lever 6, a tie loop 7 being secured to the pressure foot and loosely overlying the hook end of the lever.

A holding member is connected to the hook end of the lever 8 comprising a U-shaped frame 9 the upper terminals of the side bars of which are pivotally connected to the hook end of the lever, the lower cross bar 10 being curved to coöperate with the tread portion of the rail and being terminally provided with hooks 11 which engage beneath the tread portion of the rail. The pressure foot is provided with pins 12 which limit the play of the locking member in one direction.

The application and operation of the improvement will be fully apparent from the above description and from Fig. 2 of the drawings, it being noted that the coöperation of the hooks with the head portion of the rail serve to prevent backward movement of the pinch bar when reaching for a new grip.

What is claimed is:—

1. A pinch bar including a pressure foot formed to coöperate with a wheel and with a rail, said foot being formed with a concavity, an operating lever having a portion shaped to conform to the concavity, a loop connecting said pressure foot and lever, and means carried by the lever to engage the head of the rail.

2. A pinch bar including a pressure foot formed to coöperate with a wheel and with a rail, said foot being formed with a concavity, an operating lever having a portion shaped to conform to the concavity, a loop connecting said pressure foot and lever, and a frame connected to the lever and provided with means to engage the tread portion of the rail.

3. A pinch bar including a pressure foot formed to coöperate with a wheel and with a rail, said foot being formed with a concavity, an operating lever having a portion shaped to conform to the concavity, a loop connecting said pressure foot and lever, and a frame pivotally connected to the lever, and hooks carried by the frame to engage beneath the head of the rail.

4. A pinch bar including a pressure foot formed to coöperate with a wheel and with a rail, said foot being formed with a concavity, an operating lever having a portion formed to conform to the concavity, a loop connecting said pressure foot and lever, a frame pivotally connected to the lever, hooks carried by the frame to engage beneath the head of the rail, the cross bar of the frame bearing upon the tread portion of the rail to form a fulcrum for the operation of the device.

In testimony whereof I affix my signature in presence of two witnesses.

GEORGE W. HOLLAND.

Witnesses:
HARRY C. WHEELER,
GUY C. WELCH.

Copies of this patent may be obtained for five cents each, by addressing the "Commissioner of Patents, Washington, D. C."